United States Patent [19]

Hellman

[11] Patent Number: 4,687,574
[45] Date of Patent: Aug. 18, 1987

[54] WATER TREATMENT SYSTEM

[75] Inventor: Goran Hellman, Miami Lakes, Fla.

[73] Assignee: The Munters Corporation, Fort Myers, Fla.

[21] Appl. No.: 709,992

[22] Filed: Mar. 11, 1985

Related U.S. Application Data

[63] Continuation of Ser. No. 600,588, Apr. 13, 1984, abandoned, which is a continuation of Ser. No. 458,331, Jan. 17, 1983, abandoned.

[51] Int. Cl.$^4$ ................................................. C02F 1/52
[52] U.S. Cl. ..................................... 210/151; 210/199; 210/202; 210/205; 210/219
[58] Field of Search ............... 210/202, 150, 151, 192, 210/201, 203, 205–208, 219, 220, 259, 521, 199

[56] References Cited

U.S. PATENT DOCUMENTS

| | | | |
|---|---|---|---|
| 2,907,463 | 10/1961 | Light et al. | 210/202 |
| 3,335,865 | 8/1967 | Cawley et al. | 210/202 X |
| 3,419,146 | 12/1968 | Koulovatos | 210/202 X |
| 3,767,051 | 10/1973 | Thompson | 210/202 X |
| 4,200,534 | 4/1980 | Besik | 210/202 X |
| 4,290,898 | 9/1981 | von Hagel et al. | 210/202 X |

*Primary Examiner*—Tom Wyse
*Attorney, Agent, or Firm*—Curtis, Morris & Safford

[57] ABSTRACT

A mobile water treatment plant capable of handling a high volume of sewage confined within the dimensions of a conventional truck-hauled container comprises:
(1) a screen to separate gross solids from liquids;
(2) a holding chamber between features 1 and 2 in which the liquid is aerated;
(3) a flocculating chamber for the liquid;
(4) a lamellar separator (bottom fed with intermediate auxillary lamellae extending $\frac{1}{2}$ to $\frac{1}{3}$ of the length of the main lamellae); and
(5) treatment of the water from the lamellar separator with "activated oxygen" as described and claimed in U.S. Pat. No. 4,214,962.

A preferred subsidiary feature is to recycle a controlled amount of the sludge separated at point 1 to the holding tank.

18 Claims, 3 Drawing Figures

WATER TREATMENT SYSTEM

This application is a continuation of application Ser. No. 600,588, filed on Apr. 13, 1984, abandoned, which was a continuation of application Ser. No. 458,331, filed on Jan. 17, 1983, abandoned.

BRIEF SUMMARY OF THE INVENTION

The present invention by combining a number of elements known previously provides a water treatment unit which can be assembled within the dimensions of a conventional truck-hauled container of the type used for containerized transport of goods.

According to one aspect of the present invention there is provided a portable water treatment system which comprises a truck-haulable container fitted with an inlet, means for separating gross solids from liquid introduced through said inlet, a tank for storing and aerating liquid from which said solids have been separated, chemical, biological or combined chemical-biological means for flocculating or coagulating solid particles remaining in said liquid, a lamellar separator fitted with intermediate auxillary lamellae and gaseous disinfectant treatment such as an activated oxygen treatment unit for treating the liquid obtained from the separator.

Plants according to the present invention can be assembled within the confines of a conventional 20 or 40 foot container. However, in order to contain the weight of water which it will be necessary to contain when in use such containers are constructed with deeper corrugations than are conventional. Normal containers for containerized shipment of goods have corrugations approximately 4 inches wide and 1 inch deep. Modified containers of the present invention have corrugations of about this width (say 3 to 5 inches wide) but of from $1\frac{1}{2}$ to 2 inches in depth. Furthermore, containers for the present invention also have reinforced top rails (typically 4 inch square steel bars) since the normal additional support provided by the roof is lacking in the containers for use in treatment method for separating solid or liquid sedimentable constituents from a liquid and is used especially for treating water, such as drinking water and sewage.

Huebner's U.S. Pat. No. 4,089,782 issued on May, 16, 1978 describes a prior art lamella clarifier in which liquid to be clarified is fed into a separator towards the bottom of inclined lamellas intermediate a main lamella and an auxiliary lamella. Clarified liquid is collected at the top and sludge in a trough at the bottom.

Other similar contructions are described in Heubner's U.S. Pat. No. 4,120,796 issued on Oct. 17, 1978 and in Engdahl et al's U.S. Pat. No. 3,928,209 issued on Dec. 23, 1975.

Another separator of this type is described, for example, on page 45 of the Handbook of Advanced Wastewater Treatment by Culp, Wesner and Culp published in 1978 by Van Nostrand Reinhold of New York.

BACKGROUND OF THE INVENTION

1. Field of the Invention

The present invention relates to a mobile waste water treatment system.

2. Description of Prior Art

Hitherto, there has been no commercially satisfactory mobile apparatus for treatment of waste water capable of dealing with volumes of up to 75,000 gallons per day. There is substantial need for such an apparatus both for use in emergencies when normal sewage systems for small to medium size communities break down and also for use by temporary communities such as expositions.

One prior art small waste water treatment unit is that disclosed in U.S. Pat. No. 4,229,202 (Mullerheim, issued Oct. 21, 1980) which separate liquid from solid waste, treats the liquid with ultraviolet radiation, preferably in such a way as to produce ozone from entrapped air and then disperses the liquid into unsaturated earth.

U.S. Pat. No. 4,028,246 (Lund, issued June 7, 1977) treats waste water with ozone in a unit having vertically disposed corrugated plates.

Other small waste water treatment units using ozone are described in U.S. Pat. Nos. 3,655,048 (Pergola, issued Apr. 11, 1972) and 3,835,039 (Ciambrone, issued Sept. 10, 1974).

However, so far as I am aware none of these prior inventions has been able to produce a portable system capable of dealing with the volumes of waste water treatable by the present invention.

A major feature of the present invention is its use of a lamellar separator. Lamella sedimentation is a well-known the invention. Furthermore, said containers are provided with four support legs instead of the conventional 2 and are provided with metal as opposed to wooden floors. Desirably, the whole of the inside of the container is coated in zinc.

Such modified containers form a further aspect of the present invention since it is believed that hitherto there had been no realization that rectangular cross section containers for such large volumes of water were practicable.

We have found that coating of the container with zinc can most effectively be carried out by spraying pure zinc from a metallizing gun.

Waste liquid being fed into the treatment unit first encounters a means for separating gross solids from liquid, for example an inclined screen such as that sold under the tradename "Hydraseive." Liquid containing dissolved and suspended solids passes from this screen into an aerating and storing tank, the primary purpose of which is to store liquid received at times of peak flow so as to equalize as far as possible the rate of flow of liquid through the remaining stages of the system. Aeration is carried out at a rate sufficient to maintain aerobic conditions in the tank. Typically, aeration at this stage is carried out at a rate of 5 cu. ft./min., although other rates may be preferable depending upon the exact composition of the waste water being treated.

It may also be desirable to feed into this tank solid sludge separated by the initial separation means after this has itself been aerated. This introduction of aerated sludge into the storage tank forms a further preferred and novel feature of the apparatus of the present invention.

Liquid from the tank is fed via a constant flow head device, which is adjustable as to the rate of flow, into means for flocculating solids remaining in the liquid. Such means can be chemical, biological or a combination of the two.

A suitable chemical flocculation treatment involves passing the liquid to be treated into two succesive flocculation chambers, each of which is fed with a conventional chemical flocculating agent. A typical chemical flocculating agent for such use is aluminum sulfate, although other materials such as flocculating polymers may be used. When using aluminum sulfate, I have found that a dosage rate in the range 50 to 150 ppm will normally be suitable.

As noted above when using a purely chemical flocculating technique, I have found it desirable to use two chambers. Paddles are mounted in each chamber about a vertical shaft. Desirably, the rate of rotation of the paddles in the first chamber is faster than that in the second. For example, a rate of from 6 to 8 rpm will be used in the first chamber and of from 4 to 6 rpm in the second chambers.

When using a biological digestion and flocculation device, I again use two chambers. The first is operated as a conventional trickle filter. Such a filter is packed with plastics media to maximise the area over which bacterial growth may occur. A suitable plastics material has a surface area of about 60 square feet per cubic foot.

When using biological flocculation the second chamber is fed with sludge which has been "stabilized" (i.e. kept in an oxygenated environment containing a minimum of growth material for the bacteria contained there). Typically, such sludge is fed at a rate of 20 to 40% by volume of the waste water being treated in this stage. The presence of the bacteria brings about agglomeration of solids particles present in the liquid.

As a further alternative one can combine chemical and biological flocculation steps. In this case, a first chamber is operated as a biological trickle bed filter as described above and the second as a chemical flocculation chamber. In this chemical flocculation chamber, however, I do not normally use paddle stirrers but achieve agitation by bubbling air into the chamber. Chemical flocculating agents are added in the same manner as in the two stage chemical treatment. Depending upon the nature of the water being treated, it may be possible to bypass the chemical treatment stage in this biological-chemical treatment system and utilize the chemical flocculation chamber only as a back up if there is an upset in the biological system.

The liquid from the flocculation stage is fed to a lamellar separator to effect sedimentation of the flocculated particles. Typically, the separator has main lamellae extending for the height of the container and set out an angle of 30° to 60° to the horizontal.

Interposed between such lamellae are auxillary lamellae extending for approximately one third to one half of the height of the main lamellae. Feed to the lamellar sedimenter is effected at the lower ends of the lamellae and in a direction parallel to the plane thereof. A suitable lamellar separator is that described in application Ser. No. 375,650 filed on May 6, 1982. The separators described therein are generally of the type which comprises a package of sedimentation lamellas arranged in parallel close to each other and sloping in relation to the horizontal plane, said device being provided with inlet means at the lower end thereof extending along a part of the height extension of the lamella package for introducing a liquid between the lamellas in a flow direction which is essentially parallel to the plane of the lamellas and essentially horizontal. They have two major features.

The first is provision to said inlet means of a throat restriction adjacent the feed to the inlet so disposed as to produce a venturi effect at said inlet thereby accelerating the liquid inflow in a direction parallel to the plane of said lamellas and substantially perpendicular to the direction of lamellar flow along said lamellas.

The inlet flow preferably deviates no more than 30°, desirably no more than 20° from the horizontal.

The second is that the inlet is fed from an influent feed chamber substantially of an inverted V-shaped configuration, said influent chamber being provided with an intermediate baffle extending across the width thereof.

The effect of the baffle is to tend to equalize the horizontal load across all the lamellas thereby improving the efficiency of the sedimentation. The baffle can be placed at any convenient point on a wall and is typically between one and two thirds of the way down the wall. It can be of any convenient shape and indeed may desirably be of varying cross section so as to improve the flow of liquid to the outermost lamellas. One convenient form presents a surface at an angle of 45° to the liquid flow. The baffle need not be linear and could conveniently be in the form of an arc.

The restrictor may be in any convenient form for example having the half pear shaped cross section. The deflection plate is of any convenient shape to ensure that liquid descending the chamber is directed to flow through the apertures. Most conveniently such a deflector plate is arcuate typically subtending a 90° angle to its centre of curvature. The combination of the restrictor and the plate causes a venturi effect which accelerates the influent in a direction parallel to the plane of said lamellas and perpendicular to the direction of lamellar flow along said lamellas at the point where it is passing into the space between the lamellas which has the result that previous problems of fresh influent passing directly into the sedimentation chamber or creating currents there are avoided. It also permits a widening of the lamellas, and thus an apparatus capable of greater through put without loss of efficiency.

Disposed between the main lamellas are smaller auxillary lamellas. Such auxiliary lamellas assist in avoiding interference of the upward lamellar flow with the downgoing sludge stream, assisting in distribution of the feed and, by virtue of the slight turbulence created at the top thereof promote the down flow of sludge particles.

Such auxiliary lamellas may extend only to a height of 0.1 to 0.6 preferably 0.2 to 0.4 the height of the main lamellas. Suitably, one such auxillary lamella can be disposed between each pair of main lamellas. Typically, such auxillary lamellas are raked at the same angle as the main lamellas. However, if desired they may have variable slope and need not be disposed at the same angle to the horizontal as the main lamellas. For example, in such a case the lower portion of an auxillary lamella is disposed at an angle to the horizontal up to 10° less than that of the main lamellas but the upper portion is parallel to the main lamellas. Furthermore, the angles to the horizontal at the edges of the auxillary lamellas particularly in the lower portions thereof may be greater than at the center. These may be disposed at the same angle to the horizontal as the main lamellas but often deviate from said angle, e.g. deviate up to about 10° from preferably the angle of the auxillary lamella.

The longitudinal extension in the direction of slope of the lamellas may vary in a high degree depending upon the treatment conditions as is well-known to an expert. A common value of the longitudinal extension is about 1 m.

The longitudinal extension ($l_1$) of the auxillary lamellas preferably stands in a certain relation to that of the main lamellas (l). Usually $l_1 = 0.1$–$0.6$ of l and preferably $0.2$–$0.4$ of l. The auxillary lamellas preferably extend from the level of the lower edge of the main lamellas to a level which corresponds to the stated longitudinal extension $l_1$ above the lower edge of the main lamellas.

The inlet for the treated water is preferably arranged at the lower end of the lamella package between the auxillary lamellas when these are and the adjacent "overlying" main lamella. Thus, the inflowing water is caused to move upwardly between the auxillary lamella on the upper side of the auxillary lamella and the upper side of the adjacent main lamella is counteracted. This contributes to enhancing the sedimentation and the sinking down of deposited material on the upper sides of the lamellas.

The auxillary lamellas can be arranged in the middle between the main lamellas but can also be arranged closer to the overlying main lamella or closer to the underlying lamella anywhere from 25 to 75% of the distance between the main lamellas.

The height extension of the inlet openings preferably amounts to at least 0.05 and especially at least 0.1 times the height extension l of the main lamellas.

Sediment from the sedimenter is discharged from the system. The clarified liquid is taken from the top of the lamellar separator and treated with chlorine or with "activated oxygen". This is an oxygen product obtained by irradiating oxygen with electromagnetic radiation of a wavelength less than 200 nanometers preferably less than 155 nm as described in U.S. Pat. No. 4,214,962 issued on July 29, 1980. It has the properties of reducing the surface tension of water;

having an ultraviolet spectrum, measured following irradiation in a polyvinyl chloride enclosure and subsequent dissolving of the product in sulfuric acid at a pH of 1,5, including emission in a frequency range including 200 nanometers;

having an ultraviolet spectrum, measured following irradiation in a polyvinyl chloride enclosure and subsequent dissolving of the product in phosphoric acid at a pH of 1.5, including absorption at 195 nanometers and at 254 nanometers;

being negatively charged;

having a greater oxidation potential than ozone; and forming manganese dioxide with sea water.

I have found that not only does this activated oxygen act as a disinfectant as described in U.S. Pat. No. 4,214,962 but it also acts to reduce the BOD of the water by removing toxic residues contained therein.

It is often desirable to provide a filter either before or after the activated oxygen treatment stage.

Sludge separated from the waste water at the preliminary screen is passed into a sludge digester wherein it is subjected to extended aeration, desirably having a residence time therein of 3 to 7 days. From the digester it is passed to a clarifier, the supernatant liquid from which may be passed directly to the activated oxygen chamber. As mentioned above some of the sludge taken from the digester can be returned to the equalization tank. The remainder is discharged to drying beds.

Mobile plants according to the present invention can treat from 10,000 to 75,000 gallons of waste water per day. Conventional treatment plants for this volume of water extend over several acres.

A modification of the apparatus of the present invention can be used to render brackish water potable. In this configuration, the apparatus comprises simply the clarifier, chemical flocculating, lamellar sedimentation and activated oxygenation elements of the apparatus.

Apparatus according to the present invention will now be described with reference to the accompanying drawings.

Figure 1:
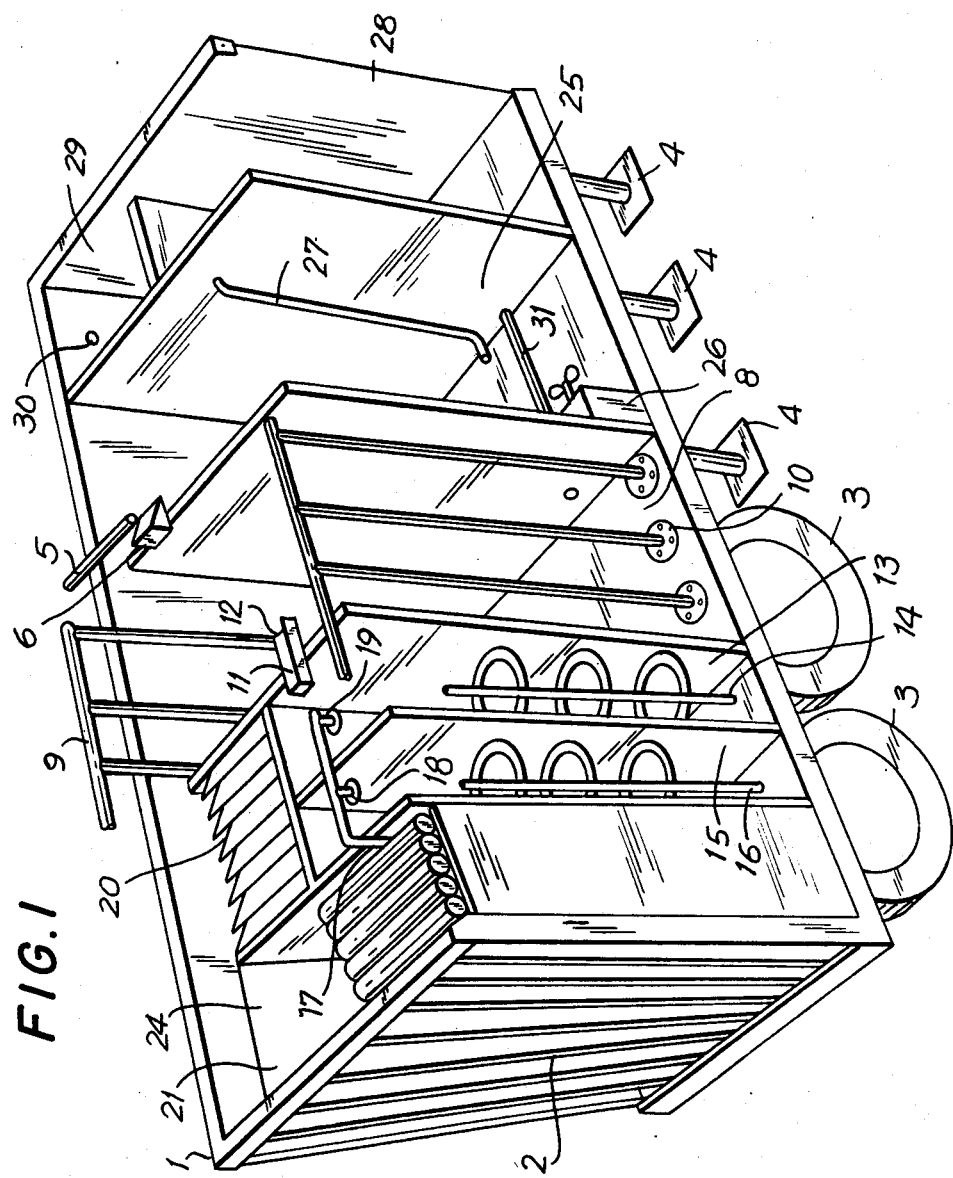
FIG. 1 shows an exploded view of an apparatus filled with two chemical flocculating chambers according to the present invention.

The unit is assembled in a container 1 having corrugated sides each corrugation 2 being approximately 1¾ inch deep and 4 inches wide. The container is haulable on wheels 3 and is provided with supports 4 to support the container when in use.

Waste water is fed into the apparatus through inlet 5 and gross solids and liquids are separated through the inclined plane seive 5. Solids are deposited to the right into the sludge digester compartment and liquids are passed into the equalization tank 8. This tank is filled with air feeds 9 which aerate the contents of the tank 8 by means of the outlets 10. Liquid from this tank is pumped into a constant flow heat 11 filtered with an adjustable weir 12 which determines the rate at which liquid is passed from tank 10 into the first flocculation chamber 13. Mounted in this chamber is a vertical paddle 14 driven from below by means of a conventional motor (not shown). Liquid from the first flocculation chamber is passed into the second flocculation chamber 15 also filled with a vertical paddle 16. Both of these chambers are fed with flocculating chemicals through feed line 17 and spray heads 18; 19.

Figure 2:
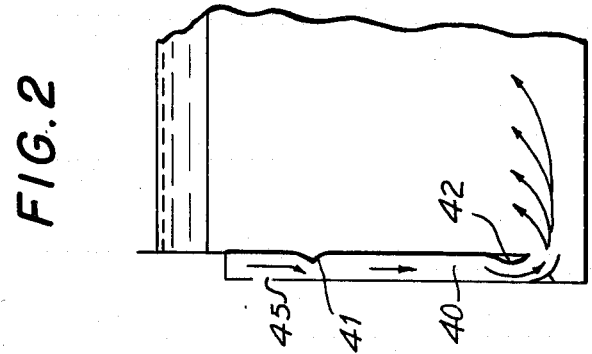
FIG. 2 shows partial sectional view of the lamellar separator used.
Figure 3:
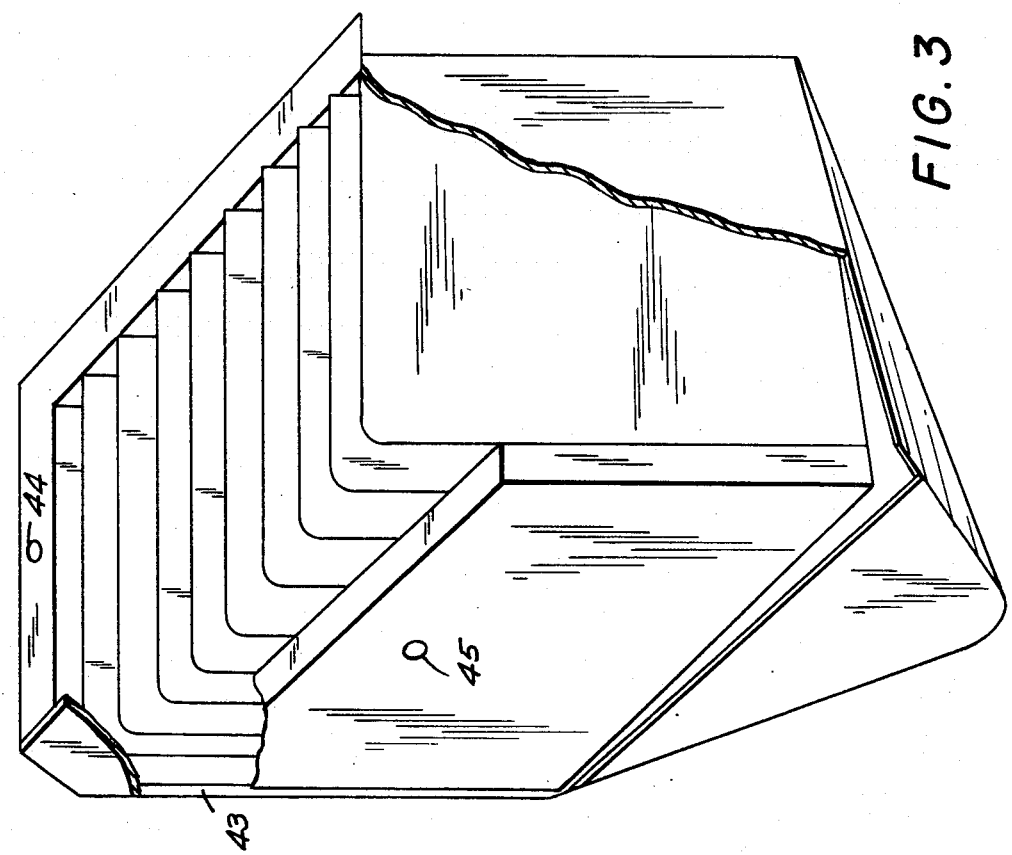
FIG. 3 shows an exploded view of the lamellar separator used.

Liquid from the second flocculating chamber is fed to a lamellar separator 20 shown in more detail in FIGS. 2 and 3.

The liquid obtained from the lamellar separator is fed to a chamber 21 where it is treated with activated oxygen released from the cylinders 22. Clear effluent is released via outlet 24.

Solids separated by screen 6 are fed into sludge digester 25 fitted with a stirrer and air inlet 26. Sludge from the bottom of this compartment is passed via line 27 into a sludge settler chamber 28, supernatant liquid from which passes into chamber 29 and exits via outlet 30 for recycle to chamber 21.

A portion of the sludge from chamber 28 is passed via line 31 back to equalization tank 8, the remainder is discharged.

FIG. 2 shows the feed of liquid into the lamella separator. Liquid from the second flocculation chamber is passed via inlet 45 into a downwardly directed channel 40 in the shape of a frustrated triangle. Mounted in said channel is a baffle 41 and at the bottom thereof a half pear shaped restrictor 42.

FIG. 3 shows the lamellae 43 and the outlet 44 into the activated oxygen treatment chamber.

I claim:

1. A portable water treatment system comprising:
means for introducing wastewater including gross solids and liquid into the system;
means for separating the gross solids from the liquid in the wastewater, said separating means producing a sludge from the gross solids;
means for storing and aerating the liquid;
means for flocculating the aerated liquid, the flocculating means including means for introducing a chemical flocculating agent into the aerated liquid and means for stirring the aerated liquid and the chemical flocculating agent;

means for sedimenting and clarifying the flocculated liquid, said sedimenting and clarifying means having a plurality of lamellae, said sedimenting and clarifying means producing a sediment and a clarified liquid;

means for disinfecting the clarified liquid;

means for digesting the sludge, said sludge digesting means producing a supernatant liquid from the sludge;

means for introducing the supernatant liquid from the sludge digesting means into the storing and aerating means; and means for introducing the sediment from the sedimenting and clarifying means into the sludge digesting means;

wherein the chemical flocculating agent is introduced into the aerated liquid in a first chamber, wherein the chemical flocculating agent and the aerated liquid in the first chamber are supplied to a second chamber, and wherein the second chamber contains the stirring means.

2. A portable water treatment system as recited in claim 1, further comprising means for filtering the clarified liquid, wherein said disinfecting means disinfects the filtered, clarified liquid.

3. A portable water treatment system as recited in claim 1, further comprising means for filtering the disinfected liquid.

4. A portable water treatment system as recited in claim 1, wherein the disinfecting means includes means for chlorinating the clarified liquid.

5. A portable water treatment system as recited in claim 1, wherein the disinfecting means includes means for treating the clarified liquid with activated oxygen.

6. A portable water treatment system as recited in claim 5, wherein the activated oxygen is obtained by irradiating oxygen with electromagnetic radiation at a wavelength of less than approximately 200 nanometers.

7. A portable water treatment system as recited in claim 6, wherein the activated oxygen is obtained by irradiating oxygen with electromagnetic radiation at a wavelength of less than approximately 155 nanometers.

8. A portable water treatment system as recited in claim 1, wherein the stirring means includes a plurality of vertically mounted paddles.

9. A portable water treatment system as recited in claim 1, wherein the first and second chambers are each equipped for the introduction of a chemical flocculating agent, and wherein the first and second chambers each contain a plurality of vertically mounted paddles.

10. A portable water treatment system as recited in claim 9, wherein the paddles in the first chamber rotate more quickly than the paddles in the second chamber.

11. A portable water treatment system as recited in claim 1, wherein the lamellae include main and auxiliary lamellae, the auxiliary lamellae extending from approximately one third to approximately one half the height of the main lamellae.

12. A portable water treatment system as recited in claim 1, wherein the lamellae are disposed at an angle in the range from about 30° to about 60° to the horizontal.

13. A portable water treatment system as recited in claim 1, wherein the sedimenting and clarifying means includes a package of sedimentation lamellae arranged in parallel and sloping in relation to the horizontal plane, the package being provided with inlet means, located at the lower end of the package and extending along part of the height extension of the package, for introducing a liquid between the lamellae in a flow direction which is substantially parallel to the plane of the lamellae and substantially horizontal, said inlet means being provided with a throat restriction upstream of said point of introduction between the lamellae, said restriction being disposed to produce a venturi effect at said point of introduction thereby accelerating the liquid flow in a direction substantially parallel to the plane of the lamellae and substantially perpendicular to the direction of the flow along the lamellae.

14. A portable water treatment system comprising:
means for introducing wastewater including gross solids and liquid into the system;
means for separating the gross solids from the liquid in the wastewater, said separating means producing a sludge from the gross solids;
means for storing and aerating the liquid;
means for flocculating the aerated liquid, the flocculating means including a trickle bed filter and means for aerating the output of the trickle bed filter, said means for aerating producing an activated sludge;
means for sedimenting and clarifying the flocculated liquid, said sedimenting and clarifying means having a plurality of lamellae, said sedimenting and clarifying means producing a sediment and a clarified liquid;
means for disinfecting the clarified liquid;
means for digesting the sludge, said sludge digesting means producing a supernatent liquid from the sludge;
means for introducing the supernatant liquid from the sludge digesting means into the storing and aerating means; and
means for introducing the sediment from the sedimenting and clarifying means into the sludge digesting means;
wherein the flocculating means further includes means for introducing a chemical flocculating agent into the aerating means.

15. A portable water treatment system as recited in claim 14, further comprising means for introducing the activated sludge into the storing and aerating means.

16. A portable water treatment system as recited in claim 14, further comprising means for digesting the sludge, said digesting means producing a supernatant liquid from the sludge, said digesting means including means for aerating the sludge.

17. A portable water treatment system as recited in claim 16, further comprising means for introducing the activated sludge into the digesting means.

18. A portable water treatment system as recited in claim 16, further comprising means for introducing the sediment into the digesting means.

* * * * *